United States Patent
Anspaugh et al.

(10) Patent No.: US 9,849,905 B2
(45) Date of Patent: Dec. 26, 2017

(54) ADJUSTABLE STEERING COLUMN ASSEMBLY

(71) Applicant: Steering Solutions IP Holding Corporation, Saginaw, MI (US)

(72) Inventors: Michael P. Anspaugh, Bay City, MI (US); Robert W. Dubay, Saginaw, MI (US); Donald A. Buzzard, Saginaw, MI (US); Jason L. Myers, Mt. Morris, MI (US); Roger A. Bourbina, Saginaw, MI (US); Randy W. Jones, North Branch, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/065,250

(22) Filed: Mar. 9, 2016

(65) Prior Publication Data

US 2017/0259841 A1 Sep. 14, 2017

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ................................ B62D 1/184; B62D 1/187
See application file for complete search history.

(56) References Cited

U.S. PATENT DOCUMENTS

| | | | | |
|---|---|---|---|---|
| 7,010,996 | B2 * | 3/2006 | Schick | B62D 1/184 280/775 |
| 8,671,795 | B2 * | 3/2014 | Ozsoylu | B62D 1/184 74/493 |
| 8,826,767 | B2 * | 9/2014 | Maniwa | B62D 1/184 280/775 |
| 8,881,618 | B2 * | 11/2014 | Buzzard | B62D 1/184 280/775 |
| 8,888,131 | B2 * | 11/2014 | Anspaugh | B62D 1/184 280/775 |
| 9,162,701 | B2 * | 10/2015 | Buzzard | B62D 1/184 |
| 9,278,706 | B2 * | 3/2016 | Tinnin | G05G 5/04 |
| 9,501,082 | B2 * | 11/2016 | Anspaugh | B62D 1/184 |
| 2004/0134302 | A1 * | 7/2004 | Ko | B62D 1/184 74/493 |
| 2014/0137693 | A1 * | 5/2014 | Buzzard | B62D 1/184 74/493 |
| 2014/0305251 | A1 * | 10/2014 | Wilkes | B62D 1/184 74/493 |

(Continued)

FOREIGN PATENT DOCUMENTS

GB    2521518    * 10/2014 ............. B62D 1/184

*Primary Examiner* — Faye M Fleming
(74) *Attorney, Agent, or Firm* — Cantor Colburn LLP

(57) ABSTRACT

An adjustable steering column assembly includes a support bracket, a jacket assembly, and a locking assembly. The support bracket is configured to connect to a vehicle. The jacket assembly is connected to the support bracket. The locking assembly is connected to and disposed between the support bracket and an adjustment lever. The locking assembly includes an inner cam connected to the support bracket and an outer cam rotatably connected to the inner cam and connected to the adjustment lever. The adjustment lever and the outer cam are movable between an unlock position and a lock position.

20 Claims, 2 Drawing Sheets

(56) References Cited

U.S. PATENT DOCUMENTS

| | | | |
|---|---|---|---|
| 2015/0090068 A1* | 4/2015 | Anspaugh | B62D 1/184 74/493 |
| 2015/0375770 A1* | 12/2015 | Buzzard | B62D 1/184 74/493 |
| 2017/0072986 A1* | 3/2017 | Ishii | B62D 1/189 |

* cited by examiner

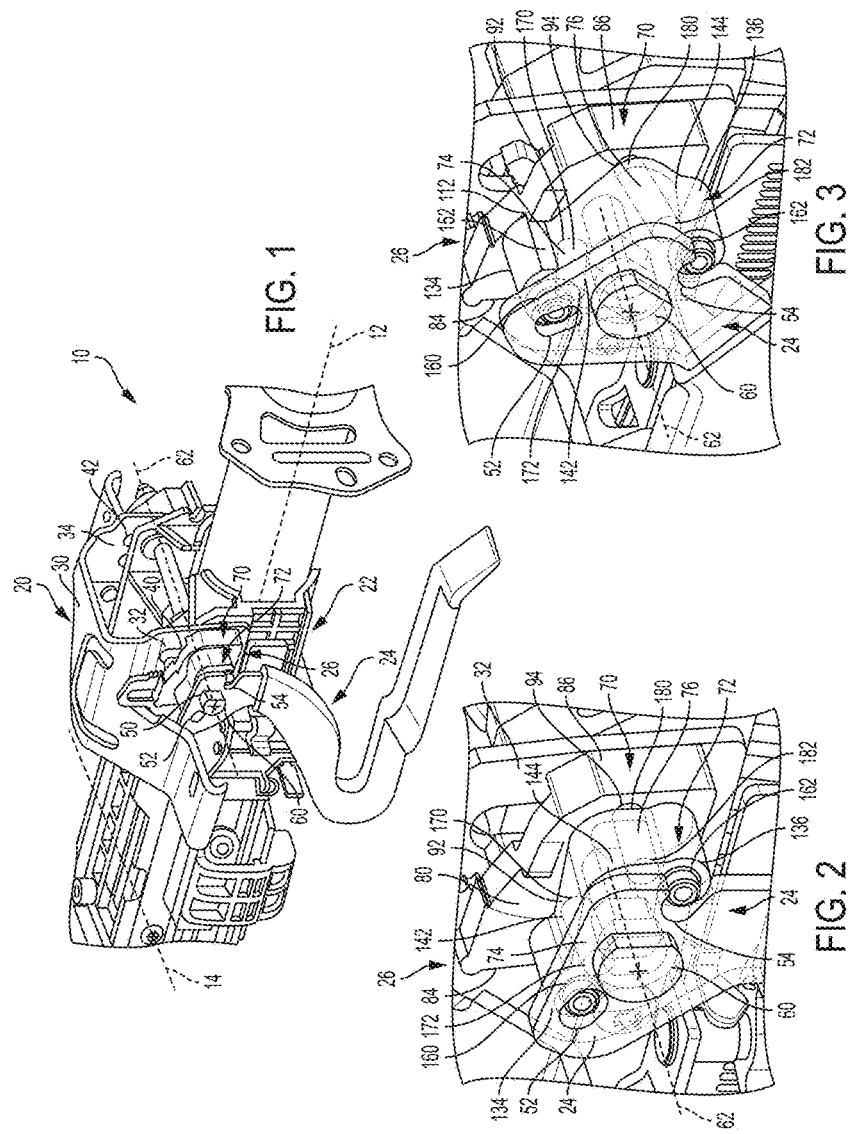

ADJUSTABLE STEERING COLUMN ASSEMBLY

BACKGROUND OF THE INVENTION

The present disclosure relates to an adjustable steering column assembly adjustable in both a tilt direction and a telescope direction.

Adjustable steering column assemblies are provided with a mechanism that enables the steering column assembly to be adjusted along a steering column axis or tilted about a pivot axis. The mechanism to enable adjustment generally employs a locking system to maintain a selected position of the adjustable steering column assembly relative to an operator of the vehicle.

SUMMARY OF THE INVENTION

According to an embodiment of the present invention, an adjustable steering column assembly is provided. The adjustable steering column assembly includes a support bracket, a jacket assembly, and a locking assembly. The support bracket is configured to connect to a vehicle. The jacket assembly is connected to the support bracket. The locking assembly is connected to and disposed between the support bracket and an adjustment lever. The locking assembly includes an inner cam connected to the support bracket and an outer cam rotatably connected to the inner cam and connected to the adjustment lever. The adjustment lever and the outer cam are movable between an unlock position and a lock position.

According to another embodiment of the present invention, an adjustable steering column assembly is provided. The adjustable steering column assembly includes a locking assembly connected to and disposed between a support bracket and an adjustment lever. The locking assembly includes an inner cam, an outer cam, and a clamp pin. The inner cam is connected to the support bracket. The inner cam defines a receiving pocket and an inner cam stop surface. The outer cam is rotatably connected to the inner cam and is connected to the adjustment lever. The outer cam defines an extending pocket and an outer cam stop surface. The clamp pin has a first end received within the receiving pocket and a second end extending into extending pocket. The inner cam stop surface is configured to engage the outer cam stop surface to inhibit further rotation of the adjustment lever, in response to rotation of the adjustment lever from a lock position towards an unlock position.

According to yet another embodiment of the present invention, an adjustable steering column assembly is provided. The adjustable steering column assembly includes a locking assembly connected to and disposed between a jacket assembly and an adjustment lever. The adjustment lever includes an inner cam, an outer cam, a first clamp pin, and a second clamp pin. The inner cam is connected to a support bracket connected to the jacket assembly. The inner cam has a first inner cam surface disposed opposite a second inner cam surface. The inner cam defines first and second receiving pockets that extend from the first inner cam surface towards the second inner cam surface. The outer cam has a first outer cam surface disposed opposite a second outer cam surface. The outer cam defines first and second extending pockets that extend from the first outer cam surface towards the second outer cam surface. The first outer cam surface abuts the first inner cam surface. The first clamp pin has a first and received within the first receiving pocket and a second end extending into the first extending pocket. The second clamp pin has a first and received within the second receiving pocket and a second end extending into the second extending pocket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of an adjustable steering column assembly;

FIG. 2 is a partial perspective view of a locking assembly of the adjustable steering column assembly in a lock position;

FIG. 3 is a partial perspective view of the locking assembly of the adjustable steering column assembly in an unlock position;

DETAILED DESCRIPTION

Figure 4:
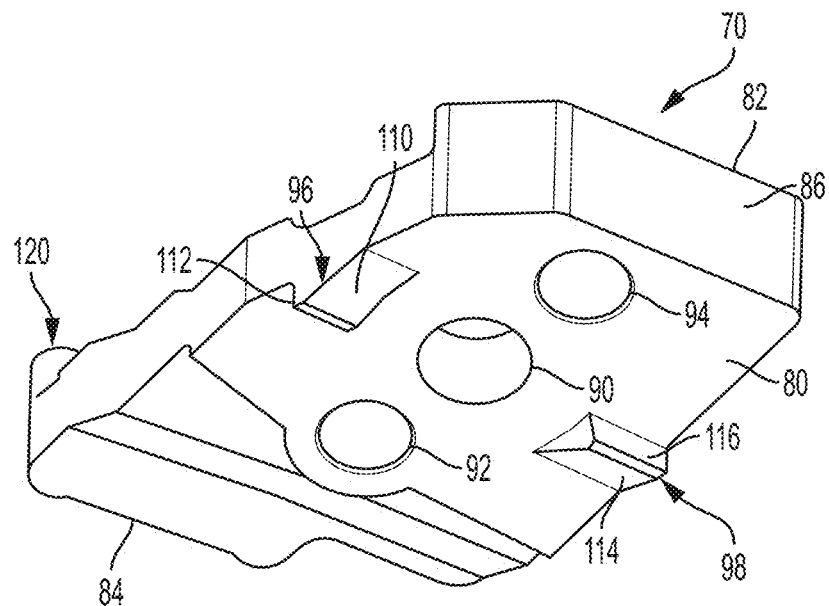
FIG. 4 is a perspective view of an inner cam of the locking assembly.
Figure 5:
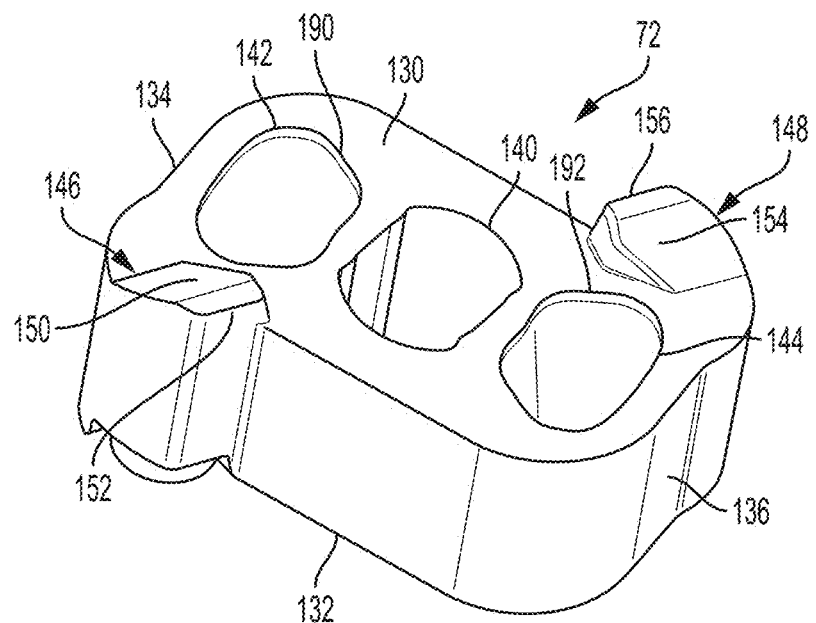
FIG. 5 is a perspective view of an outer cam of the locking assembly.

Referring now to the Figures, where the invention will be described with reference to specific embodiments, without limiting same, it is to be understood that the disclosed embodiments are merely illustrative of the invention that may be embodied in various and alternative forms. Various elements of the disclosed embodiments may be combined or omitted to form further embodiments of the invention. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

Referring to FIG. 1, an adjustable steering column assembly 10 is shown. The adjustable steering column assembly 10 is provided with a vehicle such as an automobile or the like. The adjustable steering column assembly 10 extends along a steering column axis 12. The adjustable steering column assembly 10 is extendable or retractable along the steering column axis 12. The adjustable steering column assembly 10 is pivotable or tiltable about a tilt axis or pivot axis 14 disposed substantially transverse to the steering column axis 12.

The adjustable steering column assembly 10 includes a support bracket 20, a jacket assembly 22, an adjustment lever 24, and a locking assembly 26. The support bracket 20 is connected to a vehicle structure. The support bracket 20 includes a body 30 having a first arm 32 and a second arm 34 extending from the body 30. The first arm 32 is disposed opposite and substantially parallel to the second arm 34. The first arm 32 defines a first rake slot 40. The first rake slot 40 extends substantially transverse to the steering column axis 12. The second arm 34 defines a second rake slot 42. The second rake slot 42 extends substantially transverse to the steering column axis 12. The jacket assembly 22 is tiltable or pivotable relative to the support bracket 20 through the first rake slot 40 and the second rake slot 42.

The jacket assembly 22 is connected to the vehicle structure through the support bracket 20. The jacket assembly 22 engages the first arm 32 and the second arm 34 of the support bracket 20. The jacket assembly 22 is extendable or retractable along the steering column axis 12 to adjust a position of a steering wheel coupled to the jacket assembly 22. The jacket assembly 22 is tiltable or pivotable about the pivot axis 14 to adjust a position of the steering wheel coupled to the jacket assembly 22.

The adjustment lever 24 is connected to the jacket assembly 22 through the locking assembly 26. The adjustment lever 24 defines an adjustment lever fastener hole 50 disposed between a first adjustment lever mounting hole 52 and the second adjustment lever mounting feature 54. The second adjustment lever mounting feature 54 is configured as a notch that extends towards the adjustment lever fastener hole 50.

The adjustment lever 24 is movable between a lock position and an unlock position. The lock position inhibits the jacket assembly 22 from being adjusted along the steering column axis 12 or about the pivot axis 14 and maintains the steering wheel connected to the jacket assembly 22 and a position stable for driving. The unlock position permits the jacket assembly 22 to be adjusted along the steering column axis 12 or about the pivot axis 14. An operator of the vehicle moves the adjustment lever 24 from the lock position towards the unlock position to adjust a position of the steering wheel connected to the jacket assembly 22. The operator of the vehicle then moves the adjustment lever 24 from the unlock position towards the lock position and the locking assembly 26 maintains the steering wheel connected to the jacket assembly 22 in the adjusted position.

The locking assembly 26 is disposed between the support bracket 20 and the adjustment lever 24. The locking assembly 26 is connected to the support bracket 20 and the adjustment lever 24. The adjustment lever 24 and the locking assembly 26 are connected to the support bracket 20 and the jacket assembly 22 by a fastener 60. The fastener 60 extends along a transverse axis 62 and the fastener 60 extends through the adjustment lever 24, the locking assembly 26, the support bracket 20 and the jacket assembly 22.

Referring to FIGS. 2-4, the locking assembly 26 includes an inner cam 70, an outer cam 72, a first clamp pin 74, and a second clamp pin 76. The inner cam 70 has a first inner cam surface 80, a second inner cam surface 82, a first inner cam end 84, and a second inner cam end 86. The first inner cam surface 80 is spaced apart from and does not engage the first arm 32 of the support bracket 20. The first inner cam surface 80 extends between the first inner cam end 84 and the second inner cam end 86.

The inner cam 70 defines an inner fastener hole 90, a first receiving pocket 92, a second receiving pocket 94, a first inner cam feature 96, and a second inner cam feature 98. The inner fastener hole 90 extends from the first inner cam surface 80 to the second inner cam surface 82. The inner fastener hole 90 extends along the transverse axis 62.

The first receiving pocket 92 and the second receiving pocket 94 extend from the first inner cam surface 80 towards the second inner cam surface 82. The first receiving pocket 92 is spaced apart from the second receiving pocket 94. The first receiving pocket 92 is disposed proximate the first inner cam end 84. The second receiving pocket 94 is disposed proximate the second inner cam end 86. The first receiving pocket 92 is disposed on a first side of the inner fastener hole 90 and the second receiving pocket 94 is disposed on a second side of the inner fastener hole 90 such that the inner fastener hole 90 is disposed between the first receiving pocket 92 and the second receiving pocket 94.

The first inner cam feature 96 and the second inner cam feature 98 extend away from the first inner cam surface 80. The first inner cam feature 96 is spaced apart from the second inner cam feature 98. The first inner cam feature 96 and the second inner cam feature 98 are disposed on opposite sides of the inner fastener hole 90 such that the inner fastener hole 90 is disposed between the first inner cam feature 96 and the second inner cam feature 98.

The first inner cam feature 96 may be configured as a ramped member or inclined member having a first inclined surface 110 and a first inner cam stop surface 112. The first inclined surface 110 is inclined towards the first inner cam end 84. The first inner cam stop surface 112 extends from an end of the first inclined surface 110 towards the first inner cam surface 80. It is contemplated that the first inner cam feature 96 may have other configurations such as a protrusion having various shapes, a locking tab, etc. In at least one embodiment, the first inner cam feature 96 may not be provided.

The second inner cam feature 98 may be configured as a ramped member or inclined member having a second inclined surface 114 and a second inner cam stop surface 116. The second inclined surface 114 is inclined towards the second inner cam end 86. The second inner cam stop surface 116 extends from an end of the second inclined surface 114 towards the first inner cam surface 80. It is contemplated that the second inner cam feature 98 may have other configurations such as a protrusion having various shapes, a locking tab, etc. In at least one embodiment, the second inner cam feature 98 may not be provided.

The second inner cam surface 82 is disposed opposite the first inner cam surface 80. The second inner cam surface 82 extends between the first inner cam end 84 and the second inner cam end 86. The second inner cam surface 82 is configured to engage the first arm 32 of the support bracket 20. The second inner cam surface 82 includes a peg feature 120 extending therefrom. The peg feature 120 is disposed proximate the first inner cam end 84. The peg feature 120 is configured to be received by or extend into the first arm 32 of the support bracket 20.

The outer cam 72 is rotatably connected to the inner cam 70. The outer cam 72 is connected to the adjustment lever 24. The outer cam 72 has a first outer cam surface 130, a second outer cam surface 132, a first outer cam end 134, and a second outer cam end 136. The first outer cam surface 130 faces towards the first inner cam surface 80. The first outer cam surface 130 is configured to engage the first inner cam surface 80.

The outer cam 72 defines an outer fastener hole 140, a first extending pocket 142, a second extending pocket 144, a first outer cam feature 146, and a second outer cam feature 148. The outer fastener hole 140 extends from the first outer cam surface 130 to the second outer cam surface 132. The outer fastener hole 140 extends along the transverse axis 62.

The first extending pocket 142 and the second extending pocket 144 extend from the first outer cam surface 130 towards the second outer cam surface 132. The first extending pocket 142 is spaced apart from the second extending pocket 144. The first extending pocket 142 is disposed proximate the first outer cam end 134. The first extending pocket 142 is proximately aligned with the first receiving pocket 92 of the inner cam 70. The first extending pocket 142 is configured as a tapered pocket that tapers towards the second outer cam surface 132.

The second extending pocket 144 is disposed proximate the second outer cam end 136. The second extending pocket 144 is proximately aligned with the second receiving pocket 94 of the inner cam 70. The second extending pocket 144 is configured as a tapered pocket that tapers towards the second outer cam surface 132.

The first extending pocket 142 is disposed on a first side of the outer fastener hole 140. The second extending pocket 144 is disposed on a second side of the outer fastener hole 140 such that the outer fastener hole 140 is disposed between the first extending pocket 142 and the second extending pocket 144.

The first outer cam feature 146 and the second outer cam feature 148 extend away from the first outer cam surface 130. The first outer cam feature 146 and the second outer cam feature 148 extend towards the first inner cam surface 80 of the inner cam 70. The first outer cam feature 146 is spaced apart from the second outer cam feature 148. The first outer cam feature 146 and the second outer cam feature 148 are disposed on opposite sides of the outer fastener hole 140 such that the outer fastener hole 140 is disposed between the first outer cam feature 146 and the second outer cam feature 148.

The first outer cam feature 146 may be configured as a ramped member or an inclined member having a first outer cam inclined surface 150 and a first outer cam stop surface 152. The first outer cam inclined surface 150 is inclined towards the second outer cam end 136. The first outer cam stop surface 152 extends from an end of the first outer cam inclined surface 150 towards the first outer cam surface 130.

The second outer cam feature 148 may be configured as a ramped member or an inclined member having a second outer cam inclined surface 154 and a second outer cam stop surface 156. The second outer cam inclined surface 154 is inclined towards the first outer cam end 134. The second outer cam stop surface 156 extends from an end of the second outer cam inclined surface 154 towards the first outer cam surface 130.

The first outer cam stop surface 152 is configured to engage the first inner cam stop surface 112 when the adjustment lever 24 is in the unlock position or is rotating towards the unlock position. In at least one embodiment, the second outer cam stop surface 156 is configured to engage the second inner cam stop surface 116 when the adjustment lever 24 is in the unlock position or is rotating towards the unlock position. The engagement between the stop surfaces of the inner cam 70 and the outer cam 72 inhibits further rotation of the adjustment lever 24 towards the unlock position.

The second outer cam surface 132 is disposed opposite the first outer cam surface 130. The second outer cam surface 132 extends between the first outer cam end 134 and the second outer cam end 136.

The outer cam 72 defines a first mounting hole 160 and a second mounting hole 162. The first mounting hole 160 and the second mounting hole 162 extend from the second outer cam surface 132 towards the first outer cam surface 130. The first mounting hole 160 is disposed proximate the first outer cam end 134. The first mounting hole 160 is offset from the first extending pocket 142 such that the first mounting hole 160 and the first extending pocket 142 are not disposed coaxially. The second mounting hole 162 is disposed proximate the second outer cam end 136. The second mounting hole 162 is offset from the second extending pocket 144 such that the second mounting hole 162 and the second extending pocket 144 are not disposed coaxially.

A first fastener extends through the first adjustment lever mounting hole 52 and the first mounting hole 160 to at least partially couple the adjustment lever 24 to the outer cam 72. A second fastener extends through the second adjustment lever mounting feature 54 and the second mounting hole 162 to at least partially couple the adjustment lever 24 to the outer cam 72. The combination of the adjustment lever 24 and the outer cam 72 are configured to pivot about the transverse axis 62 of the fastener 60 relative to the inner cam 70 in response to an operator rotating the adjustment lever 24 between the unlock position and the lock position.

The first clamp pin 74 and the second clamp pin 76 are disposed on and received at least partially within the inner cam 70 and extend into the outer cam 72. The first clamp pin 74 includes a first clamp pin first end 170 and a first clamp pin second end 172 disposed opposite the first clamp pin first end 170. The first clamp pin first end 170 is received within the first receiving pocket 92 of the inner cam 70. The first clamp pin first end 170 has a diameter that is less than a diameter of the first receiving pocket 92 of the inner cam 70. In at least one embodiment, the first receiving pocket 92 of the inner cam 70 has a spherical radius larger than a radius of the first clamp pin first end 170. The first clamp pin second end 172 extends into and is received by the first extending pocket 142. The first clamp pin second end 172 has a diameter at the base of the first extending pocket 142 that is less than a diameter of the first extending pocket 142.

The second clamp pin 76 includes a second clamp pin first end 180 and a second clamp pin second end 182 disposed opposite the second clamp pin first end 180. The second clamp pin first end 180 is received within the second receiving pocket 94 of the inner cam 70. The second clamp pin first end 180 has a diameter that is less than a diameter of the second receiving pocket 94 of the inner cam 70. In at least one embodiment, the second receiving pocket 94 of the inner cam 70 has a spherical radius larger than a radius of the second clamp pin first end 180. The second clamp pin second end 182 extends into and is received by the second extending pocket 144. The second clamp pin second end 182 has a diameter at the base of the second extending pocket 144 that is less than a diameter of the second extending pocket 144.

The first clamp pin 74 and the second clamp pin 76 are disposed substantially parallel to the transverse axis 62 while the adjustment lever 24 and the outer cam 72 of the locking assembly 26 are in the lock position, as shown in FIG. 2. The first clamp pin 74 and the second clamp pin 76 are disposed in a nonparallel relationship with respect to the transverse axis 62 while the adjustment lever 24 and the outer cam 72 of the locking assembly 26 are in the unlock position, as shown in FIG. 3.

Prior to an operator of the vehicle performing a rake or linear adjustment of the steering wheel coupled to the jacket assembly 22, the adjustment lever 24 and the locking assembly 26 may be in the lock position. The operator of the vehicle rotates the adjustment lever 24 from the lock position towards the unlock position. The rotation of the adjustment lever 24 causes the outer cam 72 to rotate relative to the inner cam 70. The relative rotation between the outer cam 72 and the inner cam 70 causes the first clamp pin 74 and the second clamp pin 76 to tilt relative to the transverse axis 62. The tilting of the first clamp pin 74 and the second clamp pin 76 tilt the first clamp pin 74 and the second clamp pin 76 from the parallel relationship relative to the transverse axis 62 towards a nonparallel relationship relative to the transverse axis 62.

As the outer cam 72 rotates relative to the inner cam 70, the first outer cam feature 146 rotates towards the first inner cam feature 96 and the second outer cam feature 148 rotates towards the second inner cam feature 98. The engagement between the first outer cam stop surface 152 of the first outer cam feature 146 with the first inner cam stop surface 112 of the first inner cam feature 96, as well as the engagement between the second outer cam stop surface 156 of the second outer cam feature 148 and the second inner cam stop surface 116 of the second inner cam feature 98, inhibits further rotation of the adjustment lever 24 and the outer cam 72 of the locking assembly 26 beyond the unlock position.

After the operator of the vehicle performs a rake or linear adjustment of the steering wheel connected to the jacket assembly 22, the operator of the vehicle rotates the adjustment lever 24 from the unlock position towards the lock position. The rotation of the adjustment lever 24 causes the outer cam 72 to rotate relative to the inner cam 70. The relative rotation between the outer cam 72 and the inner cam 70 causes the first clamp pin 74 and the second clamp pin 76 to tilt relative to the transverse axis 62. The tilting of the first clamp pin 74 and the second clamp pin 76 tilt the first clamp pin 74 and the second clamp pin 76 from the non-parallel relationship relative to the transverse axis 62 towards a parallel relationship relative to the transverse axis 62.

The first clamp pin 74 tilts towards the first outer cam feature 146. A surface of the first clamp pin 74 engages a first stop edge 190 that extends between an edge of the first extending pocket 142 and an edge of the first outer cam feature 146. In at least one embodiment, the first stop edge 190 is defined by an intersection between first outer cam surface 130 and the first extending pocket 142. The second clamp pin 76 tilts towards the second outer cam feature 148. A surface of the second clamp pin 76 engages a second stop edge 192 that extends between an edge of the second extending pocket 144 and an edge of the second outer cam feature 148. In at least one embodiment, the second stop edge 192 is defined by an intersection between first outer cam surface 130 and the second extending pocket 144. The engagement between the surface of the first clamp pin 74 and the first stop edge 190, as well as the engagement between the surface of the second clamp pin 76 and the second stop edge 192, inhibits further rotation of the adjustment lever 24 and the outer cam 72 of the locking assembly 26 beyond the lock position. Upon achieving the lock position, the steering wheel connected to the jacket assembly 22 is held in the adjusted position and is steady for driving.

The first clamp pin 74 and the second clamp pin 76 control the position of the outer cam 72 relative to the inner cam 70 of the locking assembly 26 at extreme positions of the adjustment lever 24, e.g. lock position and unlock position. At the lock position, no extended post interfacing slots are employed, thereby reducing manufacturing complexity and material usage of the locking assembly 26. At the unlock position, the features of the inner cam 70 and the outer cam 72 control the position of the adjustment lever 24 to inhibit over-travel of the adjustment lever 24 beyond the unlock position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column assembly, comprising:
   a support bracket configured to connect to a vehicle;
   a jacket assembly connected to the support bracket; and
   a locking assembly connected to and disposed between the support bracket and an adjustment lever, the locking assembly comprising:
   an inner cam connected to the support bracket,
   an outer cam rotatably connected to the inner cam and connected to the adjustment lever, and
   a clamp pin disposed on the inner cam and extending into the outer cam;
   the adjustment lever and the outer cam are movable between an unlock position and a lock position.

2. The adjustable steering column assembly of claim 1, further comprising a fastener that extends along a transverse axis through the adjustment lever, the inner cam, the outer cam, and the support bracket to couple the support bracket and the locking assembly to the jacket assembly.

3. The adjustable steering column assembly of claim 2, wherein the inner cam defines a receiving pocket that is configured to receive a first end of the clamp pin.

4. The adjustable steering column assembly of claim 3, wherein the outer cam defines an extending pocket that is configured to receive a second end of the clamp pin.

5. The adjustable steering column assembly of claim 4, wherein the clamp pin is disposed substantially parallel to the transverse axis while the adjustment lever and the outer cam are in the lock position.

6. The adjustable steering column assembly of claim 5, wherein the clamp pin is disposed in a non-parallel relationship with respect to the transverse axis while the adjustment lever and the outer cam are in the unlock position.

7. An adjustable steering column assembly, comprising:
   a locking assembly connected to and disposed between a support bracket and an adjustment lever, the locking assembly including:
   an inner cam connected to the support bracket, the inner cam defining a receiving pocket and an inner cam stop surface,
   an outer cam rotatably connected to the inner cam and connected to the adjustment lever, the outer cam defining an outer fastener hole extending along a transverse axis, an extending pocket and an outer cam stop surface, and
   a clamp pin having a first end received within the receiving pocket and a second end extending into the extending pocket, in response to rotation of the adjustment lever from a lock position towards an unlock position, the inner cam stop surface is configured to engage the outer cam stop surface to inhibit further rotation of the adjustment lever and the clamp pin is disposed in a nonparallel relationship with respect to the transverse axis.

8. An adjustable steering column assembly, comprising:
   a locking assembly connected to and disposed between a jacket assembly and an adjustment lever, the locking assembly comprising:

an inner cam connected to a support bracket that is connected to the jacket assembly, the inner cam having a first inner cam surface disposed opposite a second inner cam surface, the inner cam defines first and second receiving pockets that extend from the first inner cam surface towards the second inner cam surface, an outer cam having a first outer cam surface disposed opposite a second outer cam surface, the outer cam defines first and second extending pockets that extend from the first outer cam surface towards the second outer cam surface, the first outer cam surface faces towards the first inner cam surface;

a first clamp pin having a first end received within the first receiving pocket and a second end extending into the first extending pocket; and a second clamp pin having a first end received within the second receiving pocket and a second end extending into the second extending pocket.

9. The adjustable steering column assembly of claim 8, wherein the inner cam defines an inner fastener hole that extends from the first inner cam surface to the second inner cam surface and is disposed between the first and second receiving pockets.

10. The adjustable steering column assembly of claim 9, wherein the outer cam defines an outer fastener hole that extends from the first outer cam surface to the second outer cam surface and is disposed between the first and second extending pockets.

11. The adjustable steering column assembly of claim 10, wherein the outer cam defines a first stop edge disposed proximate an edge of the first extending pocket and the outer cam defines a second stop edge disposed proximate an edge of the second extending pocket.

12. The adjustable steering column assembly of claim 11, wherein a fastener extends along a transverse axis through an adjustment lever fastener hole, the outer fastener hole, and the inner fastener hole to couple the adjustment lever and the locking assembly to the jacket assembly.

13. The adjustable steering column assembly of claim 12, wherein in response to rotation of the adjustment lever from a lock position towards an unlock position, the outer cam rotates relative to the inner cam and tilts the first and second clamp pins from a parallel relationship relative to the transverse axis towards a non-parallel relationship relative to the transverse axis.

14. The adjustable steering column assembly of claim 13, wherein engagement between a surface of the first clamp pin and the first stop edge and engagement between a surface of the second clamp pin and the second stop edge inhibits further rotation of the adjustment lever towards the lock position.

15. The adjustable steering column assembly of claim 12, wherein the inner cam defines a first inner cam feature and a second inner cam feature extending from the first inner cam surface towards the first outer cam surface.

16. The adjustable steering column assembly of claim 15, wherein the outer cam defines a first outer cam feature and a second outer cam feature extending from the first outer cam surface towards the first inner cam surface.

17. The adjustable steering column assembly of claim 16, wherein in response to rotation of the adjustment lever from an unlock position towards a lock position, the outer cam rotates relative to the inner cam and tilts the first and second clamp pins from a non-parallel relationship relative to the transverse axis towards a parallel relationship relative to the transverse axis.

18. The adjustable steering column assembly of claim 17, wherein engagement between the first outer cam feature and the first inner cam feature and engagement between the second outer cam feature and the second inner cam feature inhibits further rotation of the adjustment lever towards the unlock position.

19. The adjustable steering column assembly of claim 11, wherein the outer cam defines first and second mounting holes that extend from the second outer cam surface towards the first outer cam surface.

20. The adjustable steering column assembly of claim 19, wherein the first mounting hole is offset from the first extending pocket and the second mounting hole is offset from the second extending pocket.

* * * * *